(12) United States Patent
Cho (10) Patent No.: US 11,567,867 B2
(45) Date of Patent: Jan. 31, 2023

(54) CONTROLLER FOR STORING DATA HAVING DIFFERENT TYPES IN ONE MEMORY BLOCK WHEN SPO OCCURS, AND METHOD OF OPERATING THE SAME

(71) Applicant: SK hynix Inc., Icheon (KR)

(72) Inventor: Hungyung Cho, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/903,191

(22) Filed: Jun. 16, 2020

(65) Prior Publication Data

US 2021/0191864 A1  Jun. 24, 2021

(30) Foreign Application Priority Data

Dec. 23, 2019  (KR) .................. 10-2019-0173075

(51) Int. Cl.
*G06F 12/0804*  (2016.01)

(52) U.S. Cl.
CPC .. *G06F 12/0804* (2013.01); *G06F 2212/1032* (2013.01)

(58) Field of Classification Search
CPC .................. G06F 12/0804; G06F 2212/1032
See application file for complete search history.

(56) References Cited

U.S. PATENT DOCUMENTS

| 8,583,865 | B1* | 11/2013 | Sade | G06F 12/0811 |
| | | | | 711/113 |
| 9,830,257 | B1* | 11/2017 | Booth | G11C 5/143 |
| 2007/0283217 | A1* | 12/2007 | Gorfajn | H03M 13/09 |
| | | | | 714/758 |
| 2012/0307827 | A1* | 12/2012 | Yong | H04L 12/18 |
| | | | | 370/390 |
| 2013/0117503 | A1* | 5/2013 | Nellans | G06F 3/0679 |
| | | | | 711/103 |
| 2015/0138884 | A1* | 5/2015 | Park | G06F 13/385 |
| | | | | 365/185.08 |
| 2016/0246807 | A1* | 8/2016 | Yu | G06F 11/1044 |
| 2016/0350015 | A1* | 12/2016 | Luo | G06F 12/023 |
| 2017/0068482 | A1* | 3/2017 | Ramalingam | G06F 3/0647 |
| 2017/0329706 | A1* | 11/2017 | Nemawarkar | G06F 11/1441 |
| 2017/0337102 | A1* | 11/2017 | Engler | G06F 12/0868 |
| 2017/0339421 | A1* | 11/2017 | Wang | H04N 19/30 |
| 2017/0371577 | A1* | 12/2017 | Liu | G06F 3/0652 |
| 2018/0032439 | A1* | 2/2018 | Jenne | G06F 12/0891 |
| 2019/0179750 | A1* | 6/2019 | Moyer | G06F 11/2069 |

FOREIGN PATENT DOCUMENTS

KR    20140034333 A    3/2014

* cited by examiner

*Primary Examiner* — Prasith Thammavong (57) ABSTRACT

A controller controls a memory device. The controller includes a buffer buffering one or more data chunks received from a host until the one or more data chunk is stored in the memory device, and a processor sorting and storing, according to data types of the one or more data chunks, the one or more data chunks buffered in the buffer in a plurality of memory regions of the memory device in a normal operation, the plurality of memory regions respectively corresponding to a plurality of data types. In response to a sudden power-off (SPO), the processor generates map data indicating a relationship between the one or more data chunks and the plurality of memory regions, generates a data string by merging the one or more data chunks, and stores the data string and the map data in a temporal memory region of the memory device.

16 Claims, 7 Drawing Sheets

CONTROLLER FOR STORING DATA HAVING DIFFERENT TYPES IN ONE MEMORY BLOCK WHEN SPO OCCURS, AND METHOD OF OPERATING THE SAME

CROSS-REFERENCE TO RELATED APPLICATION

This application claims priority under 35 U.S.C. § 119 to Korean Patent Application No. 10-2019-0173075 filed on Dec. 23, 2019, which is incorporated herein by reference in its entirety.

BACKGROUND

1. Field

Exemplary embodiments relate to a controller for controlling a memory device and an operating method thereof.

2. Discussion of the Related Art

The computer environment paradigm has been transitioning to ubiquitous computing, which enables computing systems to be used anytime and everywhere. As a result, use of portable electronic devices such as mobile phones, digital cameras, and laptop computers has rapidly increased. These portable electronic devices each use a memory system having one or more memory devices for storing data. A memory system may be used as a main memory device or an auxiliary memory device of a portable electronic device.

Since memory systems have no mechanical driving parts, they provide advantages such as excellent stability and durability, high information access speed, and low power consumption. Examples of the memory systems having such advantages include universal serial bus (USB) memory devices, memory cards having various interfaces, and solid state drives (SSD).

SUMMARY

Various embodiments are directed to a controller capable of guaranteeing a rapid shut-down and atomicity of a memory system even when an SPO (Sudden Power-Off) of the memory system occurs.

In an embodiment, a controller for controlling a memory device, the controller comprising: a buffer buffering one or more data chunk received from a host, until the one or more data chunk is stored in the memory device; and a processor sorting and storing, according to data types of the one or more data chunks, the one or more data chunks buffered in the buffer in a plurality of memory regions of the memory device in a normal operation, the plurality of memory regions respectively corresponding to a plurality of data types, wherein, in response to the occurrence of a sudden power-off (SPO), the processor generates map data indicating a relationship between the one or more data chunks and the plurality of memory regions, and generates a data string by merging the one or more data chunks, and stores the data string and the map data in a temporal memory region of the memory device.

In an embodiment, a method of operating of a controller for controlling a memory device, the method may include: buffering one or more data chunks received from a host into an internal buffer of the controller; sorting and storing the one or more data chunks buffered in the internal buffer into a plurality of memory regions of the memory device according to data types of the one or more data chunks, during a normal operation, the plurality of memory regions respectively corresponding to a plurality of data types; in response to the occurrence of an SPO, generating map data indicating a relationship between the one or more data chunks buffered in the internal buffer and the plurality of memory regions of the memory device according to the data types of the one or more data chunks; and generating a data string by merging the one or more data chunks, and temporally storing the data string and the map data in a temporal memory region of the memory device.

DETAILED DESCRIPTION

Hereafter, exemplary embodiments of the present disclosure will be described in detail with reference to the accompanying drawings. It should be understood that the following descriptions will be focused on portions required for understanding an operation in accordance with an embodiment, and descriptions of the other portions will be ruled out in order not to unnecessarily obscure subject matters of the present disclosure.

Hereafter, exemplary embodiments will be described in more detail with reference to the accompanying drawings.

Figure 1:
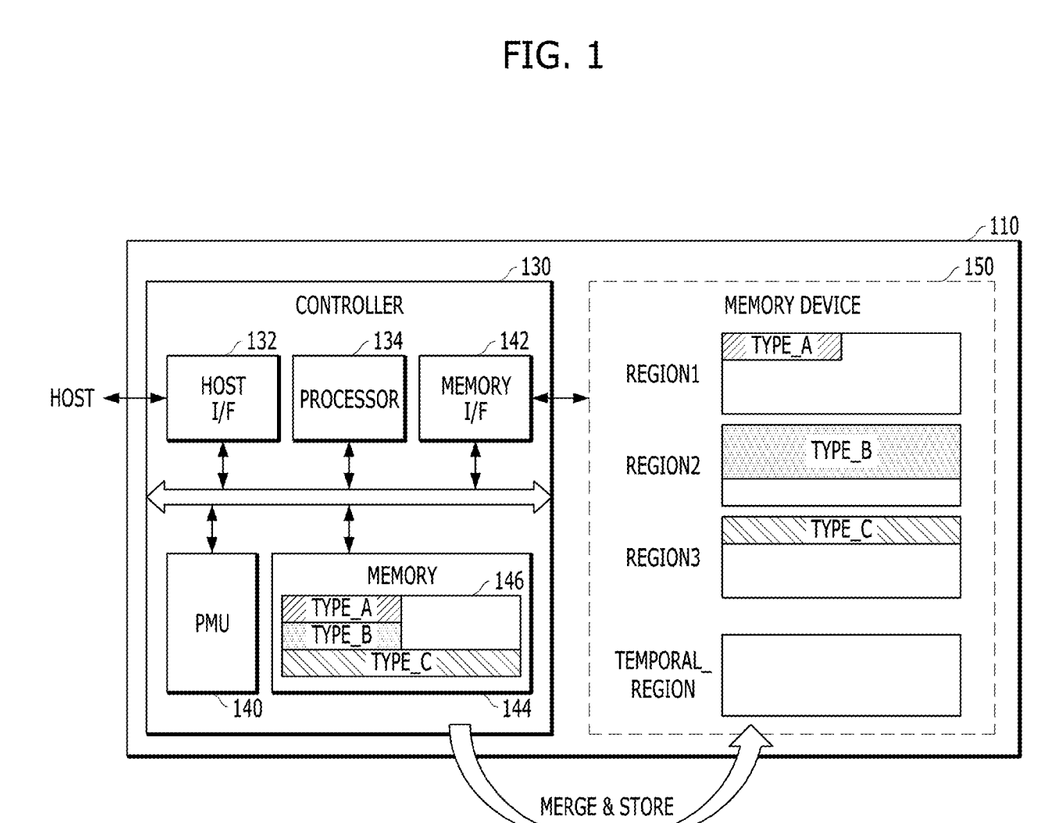
FIG. 1 is a diagram schematically illustrating a memory system in accordance with an embodiment.

FIG. 1 is a block diagram illustrating a memory system 110 in accordance with an embodiment of the present disclosure.

The memory system 110 may operate to store data for a host in response to a request of the host. Non-limiting examples of the memory system 110 may include a solid state drive (SSD), a multi-media card (MMC), a secure digital (SD) card, a universal storage bus (USB) device, a universal flash storage (UFS) device, a compact flash (CF) card, a smart media card (SMC), a personal computer memory card international association (PCMCIA) card, and a memory stick. The MMC may include an embedded MMC (eMMC), a reduced size MMC (RS-MMC), a micro-MMC, and the like. The SD card may include a mini-SD card, a micro-SD card, and the like.

The host may include at least one operating system (OS), which may manage and control overall functions and operations of the host and provide an operation between the host and a user. The OS may support functions and operations corresponding to user's requests. For example, the OS may include a general OS and a mobile OS according to the mobility of the host. The general OS may include a personal OS and an enterprise OS according to system requirements or user's working environment.

The memory system 110 may be embodied by various types of storage devices. Examples of such storage devices may include, but are not limited to, any of volatile memory devices such as a dynamic random access memory (DRAM) and a static RAM (SRAM) and/or any of nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), and a flash memory. The flash memory may have a 3-dimensional (3D) stack structure.

The memory system 110 may include a controller 130 and a memory device 150. The memory device 150 may store data for the host, and the controller 130 may control data storage into the memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host connected to the memory system 110 can be improved. In another example, the controller 130 and the memory device 150 may be integrated as one semiconductor device to constitute a memory card such as a personal computer memory card international association (PCMCIA) card, a compact flash (CF) card, a smart media (SM) card, a memory stick, a multimedia card (MMC) such as a reduced size MMC (RS-MMC) or a micro-MMC, a secure digital (SD) card such as a mini-SD card, a micro-SD card, or SDHC card, or a universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device, and may retain data stored therein even when power is not supplied thereto. The memory device 150 may store data provided by the host through a program operation, and provide data stored therein to the host through a read operation.

In accordance with an embodiment of the present disclosure, the memory device 150 may include a non-volatile memory such as a NAND flash memory. However, the memory device 150 may be realized as any of a Phase Change Random Access Memory (PCRAM), a Resistive Random Access Memory (RRAM or ReRAM), a Ferroelectric Random Access Memory (FRAM), a Spin Transfer Torque Magnetic Random Access Memory (STT-RAM or STT-MRAM), and so on.

The controller 130 may control the memory device 150 in response to a request from the host. For example, the controller 130 may provide data read from the memory device 150 to the host, and store data provided by the host into the memory device 150. For this operation, the controller 130 may control read, program, and erase operations of the memory device 150.

The controller 130 may include a host interface (I/F) 132, a processor 134, a memory I/F 142, and a memory 144 all operatively coupled to each other via an internal bus.

The host I/F 132 may be configured to process a command and data provided by the host, and may communicate with the host using one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI), and integrated drive electronics (IDE).

The host I/F 132 may be driven through firmware referred to as a host interface layer (HIL) in order to exchange data with the host.

The memory I/F 142 may serve as a memory/storage interface for interfacing the controller 130 and the memory device 150 such that the controller 130 controls the memory device 150 in response to a request from the host. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory I/F 142 may be driven through firmware referred to as a flash interface layer (FIL) in order to exchange data with the memory device 150.

The controller 130 may further include a power management unit (PMU) 140. The PMU 140 may supply external power, supplied from the outside, as power for driving the memory system 110. The PMU 140 may monitor the supply of the external power to detect whether an SPO (Sudden Power-Off) occurs in the memory system 110.

The memory 144 may serve as a working memory of the memory system 110 and the controller 130, and store data for driving the memory system 110 and the controller 130. The controller 130 may control the memory device 150 to perform read, program, and erase operations in response to a request from the host. The controller 130 may provide data read from the memory device 150 to the host, may store data provided by the host into the memory device 150. The memory 144 may further store data required for the controller 130 and the memory device 150 to perform these operations.

The memory 144 may be embodied by a volatile memory. For example, the memory 144 may be embodied by a static random access memory (SRAM) or a dynamic random access memory (DRAM). The memory 144 may be disposed within or out of the controller 130. FIG. 1 exemplifies the memory 144 disposed within the controller 130. In another embodiment, the memory 144 may be embodied by an external volatile memory having a memory interface transferring data between the memory 144 and the controller 130.

The memory 144 may buffer data exchanged between the host and the memory device 150 and cache map data and the like required for a command operation when the command operation is performed in response to a command provided by the host. FIG. 1 illustrates the memory 144 including a buffer 146 for buffering data chunks received from the host together with a write command.

The processor 134 may control the overall operations of the memory system 110. The processor 134 may drive firmware to control the overall operations of the memory system 110. The firmware may be referred to as a flash translation layer (FTL). The processor 134 may be realized with a microprocessor or a central processing unit (CPU).

The controller 130 may perform an operation requested by the host through the use of the processor 134. In other words, the controller 130 may perform a command operation corresponding to a command received from the host. The controller 130 may perform, as a foreground operation, the command operation corresponding to the command received from the host. For example, the controller 130 may perform a program operation corresponding to a write command, a read operation corresponding to a read command, an erase operation corresponding to an erase command, and a parameter set operation corresponding to a set parameter command or a set feature command.

For example, the host I/F 132 may receive a data chunk together with a write command from the host, and buffer the received data chunk in the buffer 146 of the memory 144. The processor 134 may control the memory device 150 to program the data chunk into the memory device 150 through the memory interface 142.

Also, the controller 130 may perform a background operation onto the memory device 150 using the processor 134. For example, the background operation performed onto the memory device 150 may include any of a garbage collection (GC) operation, a wear-leveling (WL) operation, a map flush operation, and a bad block management operation.

The controller 130 may classify the data buffered in the buffer 146 according to types of the data, and store the classified data in the memory device 150. The memory device 150 may include a plurality of memory regions in which data can be stored according to types of the data. Each of the memory regions may include one or more memory blocks.

Examples of the case in which the controller 130 classifies data according to data types may include a case in which the controller 130 classifies the data according to directive type information provided by the host. When providing a write command and a data chunk to the memory system 110, the host may provide directive type information of the data chunk together. Write data chunks having the same directive type may be associated with one another. When the memory system 110 supports a directive function, the memory system 110 may sort and process the write data chunks based on the directive type information of the write data chunks received from the host, thereby improving the performance of the memory system 110.

FIG. 1 illustrates the memory system 110 that sorts write data according to data types, and stores the sorted write data in the plurality of memory regions of the memory device 150 that respectively correspond to different data types. FIG. 1 illustrates first to third memory regions REGION1 to REGION3 included in the memory device 150. In each of the memory regions REGION1 to REGION3 shown in FIG. 1, a portion with a pattern indicates an occupied portion having data stored therein, and an empty portion indicates a free portion having no data stored therein. Different types of patterns indicate different types of data. For example, A-type data TYPE_A may be stored in the first memory region REGION1, B-type data TYPE_B may be stored in the second memory region REGION2, and C-type data TYPE_C may be stored in the third memory region REGION3. The memory device 150 further includes a temporal memory region TEMPORAL_REGION. The temporal memory region TEMPORAL_REGION illustrated in FIG. 1 will be described below.

The buffer 146 may buffer data chunks which have been received from the host before the data chunks are programmed into the memory device 150. FIG. 1 illustrates that the buffer 146 buffers an A-type data chunk TYPE_A, a B-type data chunk TYPE_B, and a C-type data chunk TYPE_C. The A-type data chunk TYPE_A buffered in the buffer 146 may be programmed into the first memory region REGION1 afterwards, the B-type data chunk TYPE_B may be programmed into the second memory region REGION2 afterwards, and the C-type data chunk TYPE_C may be programmed into the third memory region REGION3 afterwards. Hereafter, referring to FIG. 2, the structure of the memory device 150 will be described in detail.

Figure 2:
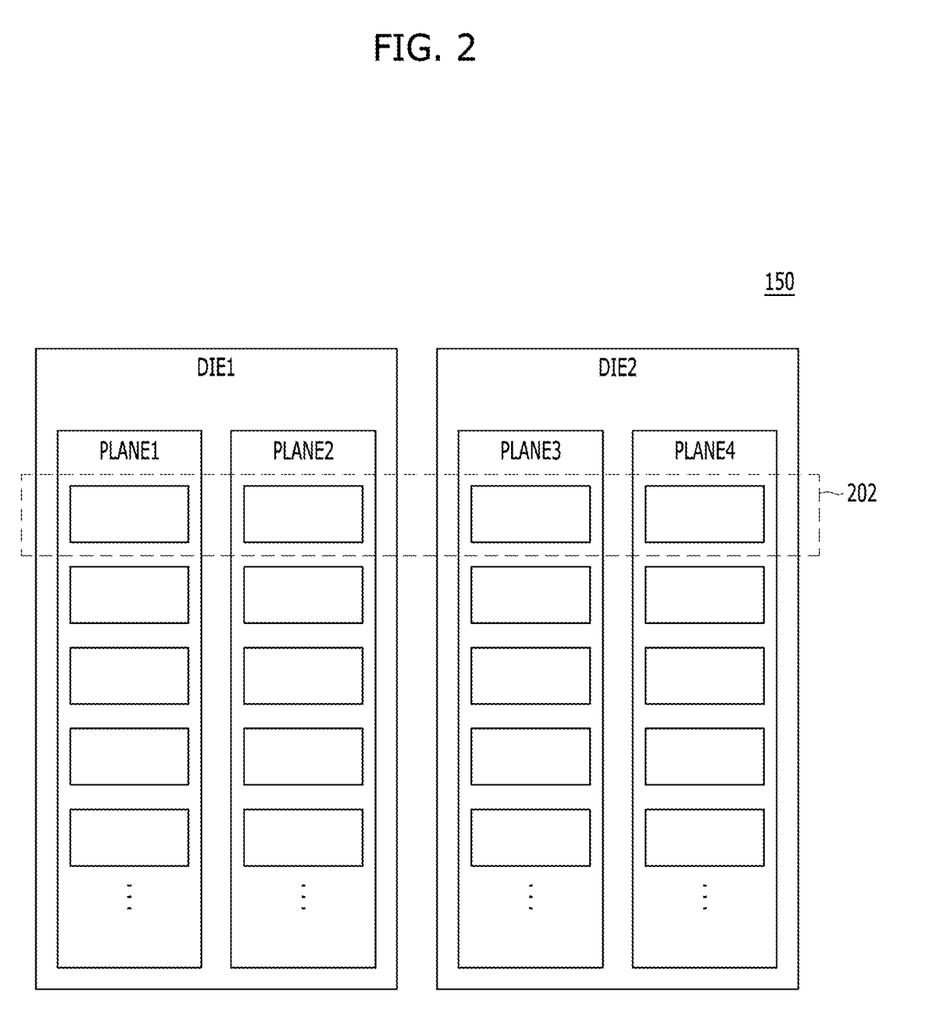
FIG. 2 is a diagram illustrating a memory device in accordance with an embodiment.

FIG. 2 is a diagram illustrating the structure of the memory device 150 shown in FIG. 1 in accordance with an embodiment.

The memory device 150 may include a flash memory. The flash memory may store data in a memory cell array including memory cell transistors. The flash memory may have a hierarchical structure of a memory die, a plane, a memory block, and a page. One memory die may receive one command at a time. One plane may process one command at a time. The flash memory may include a plurality of memory dies. One memory die may include a plurality of planes, and the plurality of planes may process commands received by the memory die in parallel. Each of the planes may include a plurality of memory blocks. A memory block may correspond to a minimum unit for performing an erase operation. One memory block may include a plurality of pages. A page may correspond to a minimum unit for performing a write operation.

FIG. 2 illustrates the memory device 150 that includes two memory dies DIE1 and DIE2. When each of the memory dies DIE1 and DIE2 includes two planes, the memory device 150 may include four planes PLANE1 to PLANE4. Each of the planes PLANE1 to PLANE4 may include a plurality of memory blocks. The numbers of memory dies, planes, and memory blocks which are illustrated in FIG. 2 are only examples, and are not limited thereto.

The processor 134 of FIG. 1 may schedule processing of commands such that as many planes as possible can process the commands at the same time in order to maximize the parallel processing performance of the memory device 150. The scheme of the processor 134 for scheduling the parallel processing may be referred to as an interleaving scheme. When the processor 134 provides a plurality of memory dies with a plurality of commands that are scheduled according to the interleaving scheme, a plurality of planes may perform a plurality of command operations at the same time based on the plurality of commands.

The processor 134 may constitute a super block by logically connecting memory blocks which can be programmed at the same time. FIG. 2 illustrates a case in which the processor 134 constitutes a first super block 202 by logically connecting corresponding memory blocks of the first to fourth planes PLANE1 to PLANE4.

The memory device 150 may include a plurality of memory regions. In an embodiment, each of the memory regions may include one or more super blocks. The plurality of memory regions may respectively correspond to a plurality of data types in order to sort and store different types of data therein.

Referring back to FIG. 1, the host I/F 132 may provide the host with a write completion response in response to a write command before a data chunk associated with the write command is actually programmed into the memory device 150. When the host I/F 132 provides the write completion response to the host before the data chunk is actually programmed, the host may be rapidly receive the write completion response from the memory system 110.

The memory system 110 needs to guarantee atomicity for a command provided by the host. For example, when the host I/F 132 provides a write completion response in response to a write command provided by the host, all data chunks associated with the write command need to be stored in the memory system 110.

Although an SPO occurs in the memory system 110, the atomicity of the memory system 110 needs to be guaranteed. When the SPO occurs, the processor 134 may control the memory device 150 to program data buffered in the buffer 146 before the memory system 110 is shut down. When the buffered data are completely programmed into the memory device 150, the processor 134 may shut down the memory system 110. The controller 130 may further include a capacitor (not illustrated) that supplies emergency power to stably shut down the memory system 110 even when the SPO occurs. For example, the capacitor may be a super capacitor.

The capacitor needs to supply sufficient power until the processor 134 completely programs the data buffered in the buffer 146 into the memory device 150. The longer the time required for programming the buffered data into the memory device 150, the larger capacity the capacitor needs to have. The increase in the capacity of the capacitor may raise the production cost of the memory system 110.

When the SPO occurs, it is difficult for the processor 134 to perform command scheduling through the interleaving scheme in which the processor 134 sorts and stores plural types of data chunks in the plurality of memory regions of the memory device 150 according to the data types of the data chunks. This is because each of the plurality of memory regions may include memory blocks of all planes, and thus mutual interference may occur among the plurality of memory regions when the plurality of memory regions perform a program operation on the same plane.

Furthermore, when the memory system 110 is powered up after the memory system 110 has been shut down due to the SPO, the processor 134 needs to perform an SPO recovery operation on all of the plurality of memory regions of the memory device 150. This is because a program operation after the occurrence of the SPO may not be successfully completed. The SPO recovery operation may include an operation of determining whether data programmed after the occurrence of the SPO has been programmed to such an extent that the data can be successfully read, and an operation of recovering the data through error correction decoding or the like according to the determination result. When the processor 134 performs the SPO recovery operation on all of the plurality of memory regions of the memory device 150, a time required for booting the memory system 110 may be increased.

In accordance with an embodiment, the processor 134 may merge one or more data chunks buffered in the buffer 146 when the SPO occurs. The processor 134 may generate map data indicating a relationship between the one or more data chunks and the plurality of memory regions. The relationship between the one or more data chunks and the plurality of memory regions may be decided based on data types of the one or more data chunks and the data types corresponding to the plurality of memory regions. The processor 134 may store the one or more data chunks and the map data in the temporal memory region TEMPORAL_REGION in the memory device 150, and shut down the memory system 110. In case of performing the command scheduling in the interleaving scheme, the processor 134 may remove mutual interference among the plurality of memory regions by storing sequential data in a single memory region. Therefore, when sequential data are stored in a single memory region, the processor 134 may perform the command scheduling more efficiently compared to when dispersively storing the sequential data in the plurality of memory regions.

When the processor 134 performs efficient command scheduling, the time required for programming the buffered data into the memory device 150 may be shortened. Therefore, when the SPO occurs, the memory system 110 may be rapidly shut down while guaranteeing the atomicity of the memory system 110. Since the memory system 110 can be rapidly shut down when the SPO occurs, the capacity of the capacitor which needs to be provided in the memory system 110 may be reduced. Therefore, it is possible to guarantee the atomicity of the memory system 110 with a low production cost.

When the memory system 110 is powered up after the memory system 110 has been shut down due to the SPO, the processor 134 may scan the temporal memory region TEMPORAL_REGION in the memory device 150 and load the data chunks and the map data stored in the temporal memory region TEMPORAL_REGION to the buffer 146. The processor 134 may store the data chunks in the memory regions associated with the respective data chunks by referring to the loaded map data. Since the processor 134 does not need to scan all of the plurality of memory regions in order to perform the SPO recovery operation, the time required for booting the memory system 110 may be reduced. Hereafter, the operation of the controller 130 in accordance with the present embodiment will be described in detail with reference to FIGS. 3 to 7.

Figure 3:
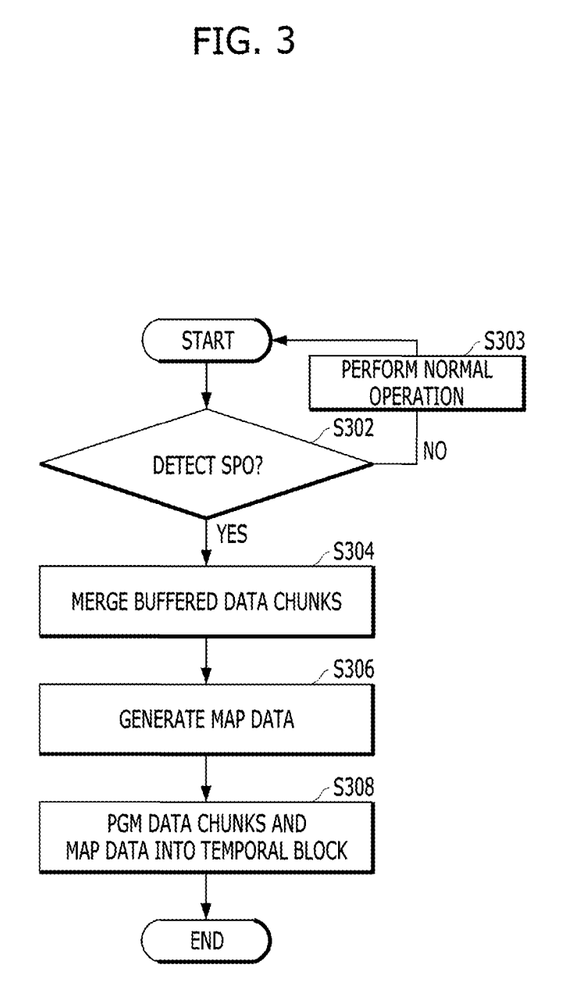
FIG. 3 is a flowchart illustrating an operation of a controller in accordance with an embodiment.

FIG. 3 is a flowchart illustrating an operation of the controller 130 of FIG. 1 in accordance with an embodiment.

Figure 4:
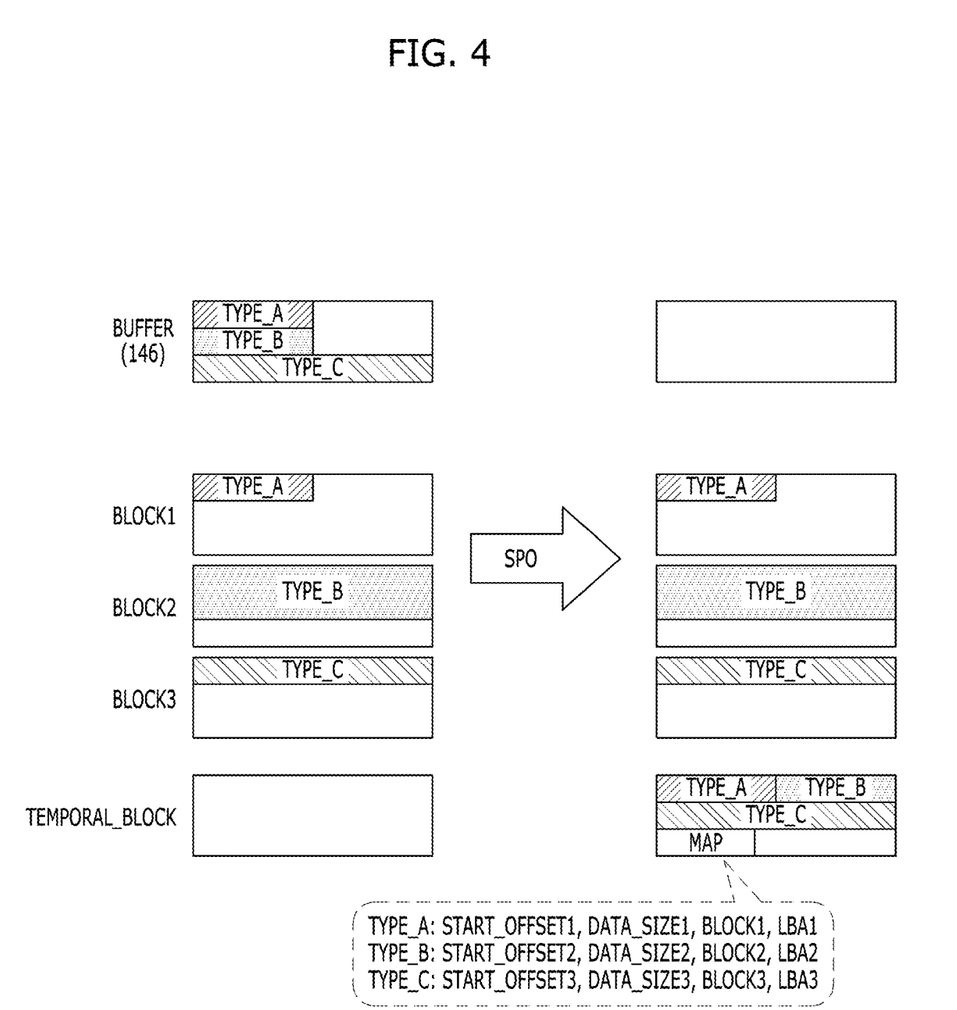
FIGS. 4 and 5 are diagrams illustrating the operation of the controller described in FIG. 3 in accordance with an embodiment.
Figure 5:
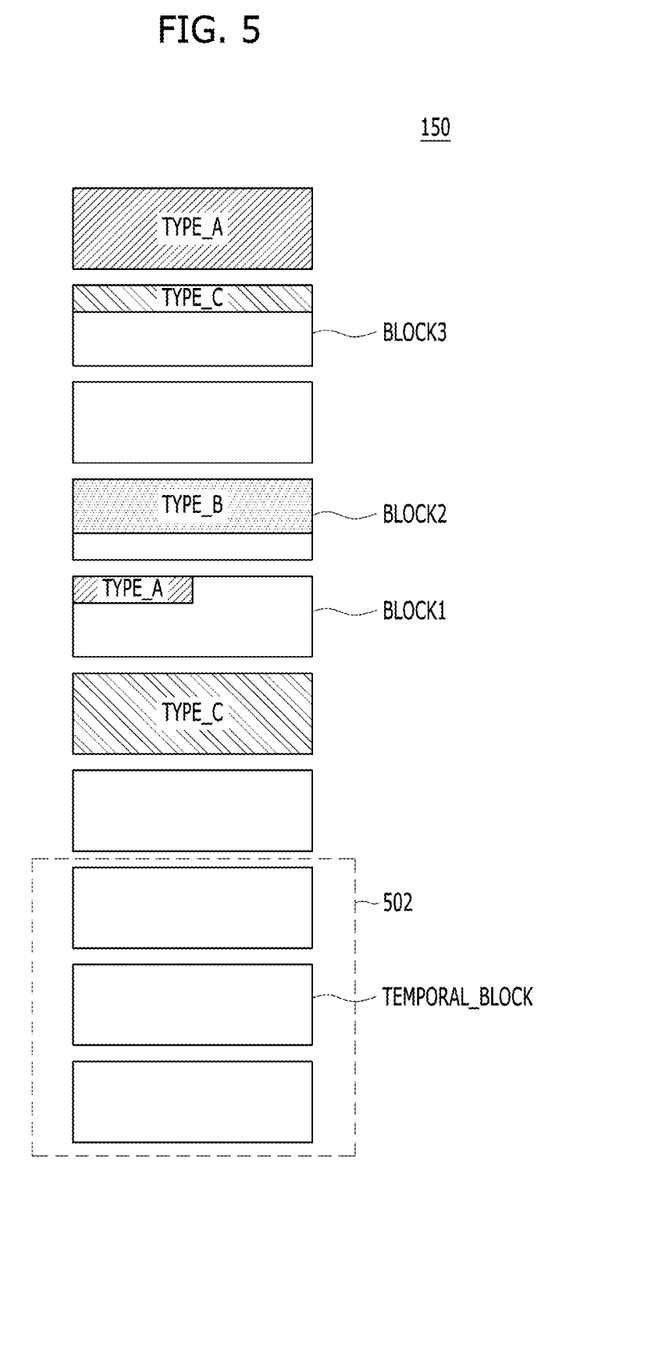

FIGS. 4 and 5 are diagrams for describing the operation of the controller 130 of FIG. 1 in accordance with an embodiment. The operations illustrated in FIGS. 3 to 5 will be described with reference to the memory system 110 illustrated in FIG. 1.

FIG. 4 illustrates the buffer 146, a plurality of open blocks BLOCK1 to BLOCK3, and a temporal block TEMPORAL_BLOCK. The plurality of open blocks BLOCK1 to BLOCK3 may be included in the first to third REGION1 to REGION3 shown in FIG. 1, respectively, and the temporal block TEMPORAL_BLOCK may be included in the temporal memory region TEMPORAL_REGION shown in FIG. 1.

The processor 134 may decide a free block, which is a memory block having no data stored therein, as an open block, and control the memory device 150 to program data into the open block.

The plurality of open blocks BLOCK1 to BLOCK3 illustrated in FIG. 4 are memory blocks for sorting and storing different types of data therein. For example, the first open block BLOCK1 belonging to the first memory region REGION1 may store A-type data TYPE_A therein. The second open block BLOCK2 belonging to the second memory region REGION2 may store B-type data TYPE_B therein. The third open block BLOCK3 belonging to the third memory region REGION3 may store C-type data TYPE_C therein. When the open block is completely programmed, the processor 134 may change the open block to a close block, and not store data in the close block until data stored in the close block is erased.

FIG. 4 illustrates each of the open blocks BLOCK1 to BLOCK3 and the temporal block TEMPORAL_BLOCK as one memory block. However, embodiments are not limited to the case in which each of the blocks is physically configured as one memory block. In another embodiment, each of the blocks may be a super block which is logically treated as one memory block.

Referring to FIG. 3, the PMU 140 may detect an SPO occurring in the memory system 110 in step S302. For example, the PMU 140 detects the occurrence of the SPO when power supplied to the memory system 110 is reduced to be less than a threshold value.

When the occurrence of the SPO is not detected in step S302, the controller 130 may perform a normal operation. For example, the processor 134 may sort and store the data chunks, buffered in the buffer 146, into the plurality of memory regions of the memory device 150 according to the data types of the data chunks.

The left side of FIG. 4 illustrates the buffer 146, the plurality of open blocks BLOCK1 to BLOCK3, and the temporal block TEMPORAL_BLOCK, when the occurrence of the SPO is not detected, i.e., when the normal operation is performed. The buffer 146 may receive an A-type data chunk TYPE_A, a B-type data chunk TYPE_B, and a C-type data chunk TYPE_C from the host, and store the received data chunks therein. FIG. 4 illustrates a case in which the A-type data chunk TYPE_A is stored in the first open block BLOCK1, the B-type data chunk TYPE_B is stored in the second open block BLOCK2, and the C-type data chunk TYPE_C is stored in the third open block BLOCK3.

Before the SPO occurs, the temporal block TEMPORAL_BLOCK may be a free block. The temporal block TEMPORAL_BLOCK will be described in detail with reference to FIG. 5.

FIG. 5 illustrates a plurality of memory blocks included in the memory device 150 in accordance with an embodiment. Each of the memory blocks is not necessarily limited to a single memory block which is physically configured as one memory block. In another embodiment, each of the memory blocks may be a super block which is logically treated as one block.

The memory device 150 may include memory regions respectively corresponding to several different data types and a temporal memory region for temporally storing data chunks stored in the buffer 146 when the SPO occurs. A region 502 represented by a dotted line indicates the temporal memory region. Memory blocks included in the temporal memory region may be decided in advance. For example, the memory device 150 may store temporal memory region information indicating the memory blocks included in the temporal memory region. The temporal memory region information stored in the memory device 150 may be retained even when power is not supplied to the memory system 110.

The processor 134 may decide any one of the memory blocks in the temporal memory region as the temporal block TEMPORAL_BLOCK of FIG. 4. For example, the processor 134 may alternately select, as the temporal block TEMPORAL_BLOCK, any one of the memory blocks in the temporal memory region. When the memory blocks in the temporal memory region are alternately selected as the temporal block TEMPORAL_BLOCK, it is possible to avoid a situation in which data are stored only in one memory block whenever the SPO occurs. As a result, it is possible to prevent the lifetime of the memory block, which is selected as the temporal block TEMPORAL_BLOCK, from being rapidly reduced.

Data may be sorted according to respective data types and stored in normal memory regions other than the temporal memory region represented by the dotted line. In each of memory blocks in the normal memory regions, a portion with a pattern indicates a portion having data stored therein, and a portion with no pattern indicates a portion having no data stored therein. Different types of patterns indicate different types of data. For example, in FIG. 5, memory blocks for storing A-type data TYPE_A therein may correspond to the first memory region REGION1. The plurality of open blocks BLOCK1 to BLOCK3 illustrated in FIG. 5 correspond to the plurality of open blocks BLOCK1 to BLOCK3 illustrated in FIG. 4, respectively.

Referring back to FIG. 3, when the occurrence of the SPO is detected in step S302, the processor 134 may merge one or more data chunks buffered in the buffer 146 in step S304.

In step S306, the processor 134 may generate map data indicating a relationship between the one or more data chunks and the plurality of memory regions of the memory device 150.

In step S308, the processor 134 may program the merged data chunks and the map data to the temporal block TEMPORAL_BLOCK, and shut down the memory system 110.

The right side of FIG. 4 illustrates the buffer 146, the plurality of open blocks BLOCK1 to BLOCK3, and the temporal block TEMPORAL_BLOCK after the memory system 110 has been shut down due to the SPO.

The processor 134 may generate a data string by merging the A-type, B-type, and C-type data chunks TYPE_A, TYPE_B, and TYPE_C buffered in the buffer 146 when the occurrence of the SPO is detected.

The processor 134 may generate the map data indicating the relationship between the data chunks TYPE_A, TYPE_B, and TYPE_C and the plurality of open blocks BLOCK1 to BLOCK3. FIG. 4 illustrates a format of map data MAP. Referring to FIG. 4, the map data MAP may include information indicating that the A-type data chunk TYPE_A has a first start offset START_OFFSET1 and a first data size DATA_SIZE1, needs to be programmed into the first memory block BLOCK1, and corresponds to a first logical address LBA1 that is a logical address provided by the host. The start offset START_OFFSET1 and the data size DATA_SIZE1 may be information indicating how many consecutive bits from a certain bit of the temporal block TEMPORAL_BLOCK are the A-type data chunk TYPE_A, i.e. a bit sequence of the corresponding data chunk. Information indicating that the A-type data chunk TYPE_A needs to be programmed into the first memory block BLOCK1 may be a physical address of the first memory block BLOCK1 associated with the A-type data chunk TYPE_A.

For each of the B-type and C-type data chunks TYPE_B and TYPE_C, the map data MAP may also include information on a start offset, a data size, a physical address of a memory block associated with the corresponding data chunk, and logical address information associated with the corresponding data chunk.

The processor 134 may store the data chunks TYPE_A, TYPE_B, and TYPE_C and the map data MAP as sequential data in the temporal block TEMPORAL_BLOCK.

In accordance with the present embodiment, the processor 134 can perform efficient command scheduling when storing the sequential data in the temporal block TEMPORAL_BLOCK, and minimize a time required for programming the sequential data.

In accordance with the present embodiment, mutual interference among the plurality of memory regions in the memory device 150 may be removed when the processor 134 schedules processing of program commands after the occurrence of the SPO as described above. Therefore, the capacity of the capacitor included in the memory system 110 can be reduced.

Since the mutual inference among the memory regions is removed, a program operation time can be estimated based on an amount of data to be programmed and program performance when data is programmed into all of the planes in the memory device 150 in parallel. The capacity of the capacitor included in the memory system 110 needs to be large enough to complete a program operation even when the program operation time is increased to the maximum value. Therefore, the capacity of the capacitor included in the memory system 110 may be decided based on the size of the buffer 146 and the program performance when data is programmed into all of the planes in parallel. Thus, a designer can easily decide the capacity of the capacitor.

Figure 6:
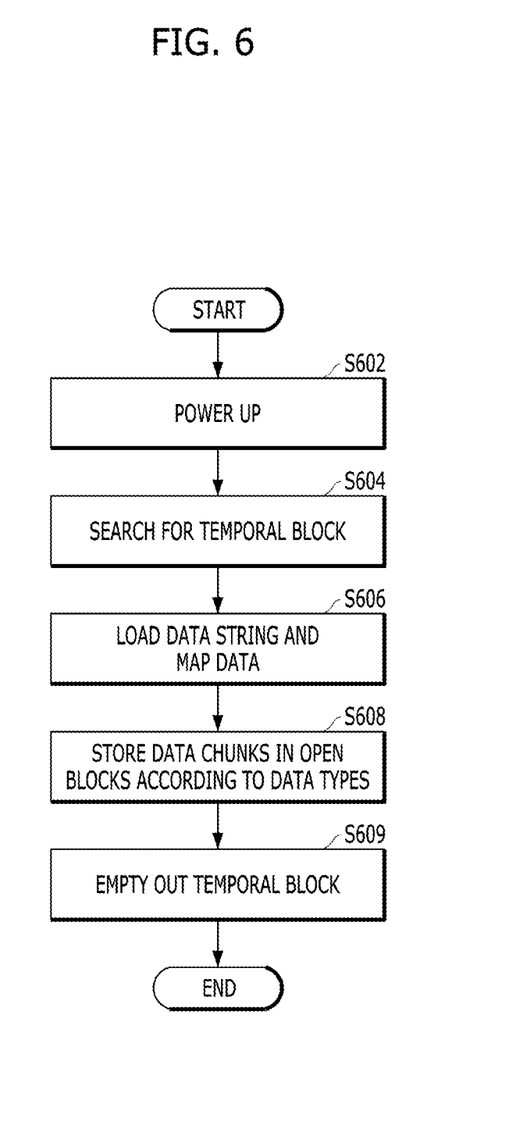
FIG. 6 is a flowchart illustrating an operation of a controller in accordance with an embodiment.

FIG. 6 is a flowchart illustrating an operation of the controller 130 in accordance with an embodiment.

Figure 7:
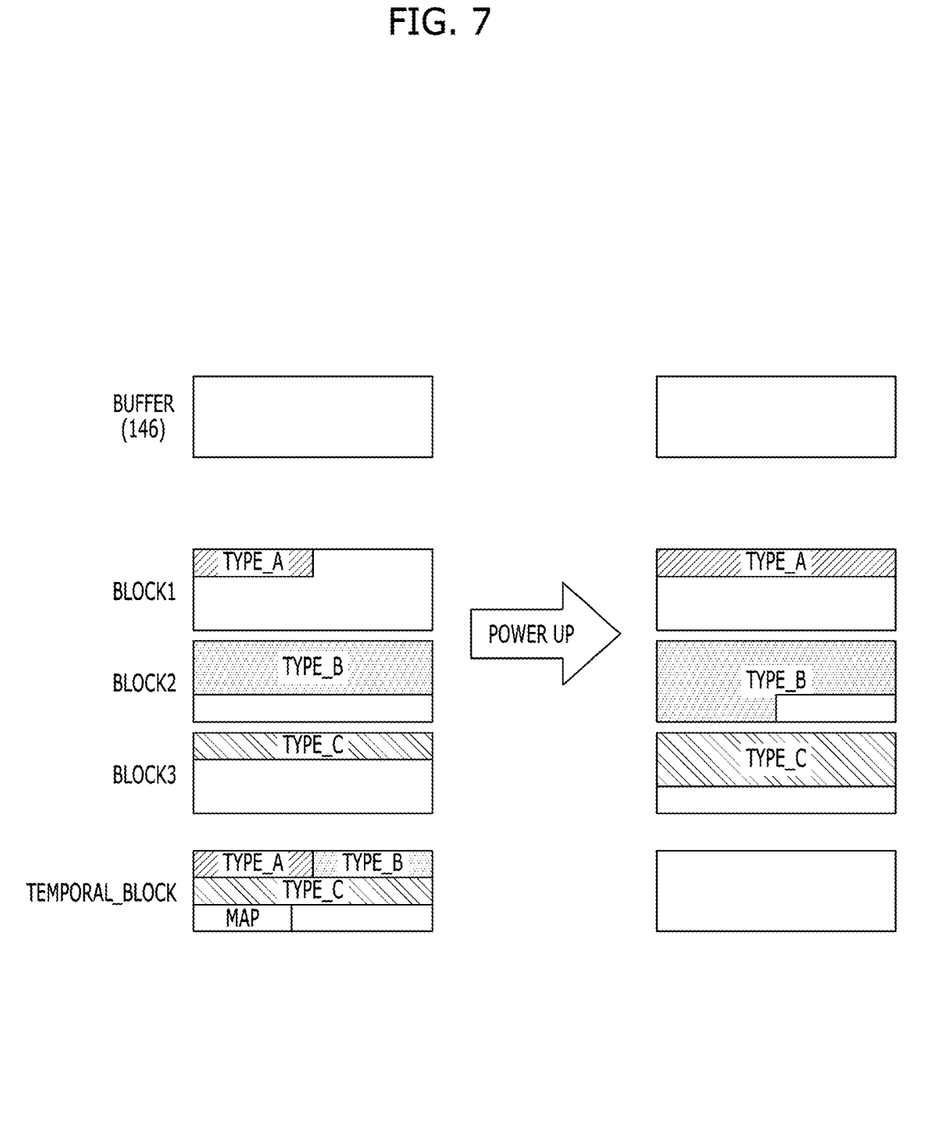
FIG. 7 is a diagram illustrating the operation of the controller described in FIG. 6 in accordance with an embodiment.

FIG. 7 is a diagram illustrating the operation of the controller 130 described in FIG. 6 in accordance with an present embodiment. The operations illustrated in FIGS. 6 and 7 will be described with reference to the memory system 110 illustrated in FIG. 1.

FIG. 7 illustrates the buffer 146, a plurality of open blocks BLOCK1 to BLOCK3 and a temporal block TEMPORAL_BLOCK. The plurality of open blocks BLOCK1 to BLOCK3 may be included in the first to third REGION1 to REGION3 shown in FIG. 1, respectively, and the temporal block TEMPORAL_BLOCK may be included in the temporal memory region TEMPORAL_REGION shown in FIG. 1. The left side of FIG. 7 illustrates the buffer 146, the plurality of open blocks BLOCK1 to BLOCK3, and the temporal block TEMPORAL_BLOCK after the memory system 110 has been shut down due to the SPO, as in the right side of FIG. 4.

Referring to FIG. 6, in step S602, when the PMU 140 detects power supplied from the outside, the memory system 110 is powered up.

In step S604, the processor 134 may search for the temporal block TEMPORAL_BLOCK among the memory blocks in the temporal memory region TEMPORAL_REGION. For example, the processor 134 may determine, as the temporal block TEMPORAL_BLOCK, a memory block having data stored therein among the memory blocks indicated by the temporal memory region information stored in the memory device 150.

In step S606, the processor 134 may load a data string including one or more data chunks and map data, stored in the temporal block TEMPORAL_BLOCK, to the memory 144. The processor 134 may perform an SPO recovery operation on the loaded data chunks. For example, the processor 314 may determine whether the loaded data chunks and map data are readable, and recover data by performing error correction decoding on the loaded data chunks according to the determination result.

In step S608, the processor 134 may sort and store the one or more data chunks in the plurality of open blocks according to data types of the one or more data chunks by referring to the map data.

In step S609, the processor 134 may control the memory device 150 to empty out the temporal block TEMPORAL_BLOCK.

Referring back to FIG. 7, the right side of FIG. 7 illustrates the buffer 146, the plurality of open blocks BLOCK1 to BLOCK3, and the temporal block TEMPORAL_BLOCK after the operations of steps S602, S604, S606, S608, and S609 shown in FIG. 6 are completed. The processor 134 may identify the one or more data chunks from the data string by referring to the map data loaded in the memory 144, and sort and store the one or more data chunks in the plurality of open blocks.

For example, referring to the map data MAP shown in FIG. 4, the processor 134 may identify a data chunk having the first data size DATA_SIZE1 from the first start offset START_OFFSET1 as the A-type data chunk TYPE_A, and control the memory device 150 to program the data chunk into the first memory block BLOCK1. The processor 134 may perform mapping between a physical address of the first memory block BLOCK1 and the first logical address LBA1 to program the data chunk into the first memory block BLOCK1.

FIG. 7 illustrates that the data chunks stored in the temporal block TEMPORAL_BLOCK are sorted and stored in the first to third memory blocks BLOCK1 to BLOCK3 according to data types of the data chunks. When the data chunks stored in the temporal block TEMPORAL_BLOCK are moved to the open blocks BLOCK1 to BLOCK3 according to the respective data types, the processor 134 may control the memory device 150 to empty out the temporal block TEMPORAL_BLOCK.

In accordance with the present embodiment, data chunks to be stored in the first to third memory blocks BLOCK1 to BLOCK3 may be programmed into the temporal block TEMPORAL_BLOCK when the SPO occurs. When the SPO occurs, data are not newly stored in the first to third memory blocks BLOCK1 to BLOCK3. Thus, when the memory system 110 is powered up after the occurrence of the SPO, the SPO recovery operation may be performed only on a dump block, e.g., the temporal block TEMPORAL_BLOCK. Therefore, the booting speed of the memory system 110 after the occurrence of the SPO may be improved.

Although various embodiments have been described for illustrative purposes, it will be apparent to those skilled in the art that various changes and modifications may be made without departing from the spirit and scope of the invention as defined in the following claims.

What is claimed is:

1. A controller for controlling a memory device, the controller comprising:
   a buffer buffering one or more data chunks received from a host until the one or more data chunks are stored in the memory device; and
   a processor sorting and storing, according to data types of the one or more data chunks, the one or more data chunks buffered in the buffer in a plurality of memory regions of the memory device in a normal operation, the plurality of memory regions respectively corresponding to a plurality of data types,
   wherein, in response to the occurrence of a sudden power-off (SPO), the processor generates map data indicating a relationship between the one or more data chunks and the plurality of memory regions, generates a data string by merging the one or more data chunks, and temporarily stores the data string and the map data in a temporal memory region of the memory device, the temporal memory region being separate from the plurality of memory regions, wherein the map data includes information indicating a start offset and a data size that indicate how many consecutive bits from a certain bit of the temporal memory region are the one or more data chunks, and wherein the controller further comprises a capacitor supplying emergency power to the controller and the memory device when the SPO occurs, the capacity of the capacitor being determined based on a size of the buffer and program performance when data are programmed into the memory device in an interleaving scheme.

2. The controller of claim 1, wherein the processor alternately selects, as a temporal block, one of memory blocks in the temporal memory region, and stores the data string and the map data in the temporal block.

3. The controller of claim 2, wherein when a memory system including the controller and the memory device is powered on after the occurrence of the SPO, the processor loads the data string and the map data from the temporal block, stores the one or more data chunks in the plurality of memory regions by referring to the map data, and controls the memory device to empty out the temporal block.

4. The controller of claim 1, wherein the data types are directive types which are received with the one or more data chunks from the host, the controller receiving, from the host, directive type information indicating a data type of each data chunk so that the processor sorts the one or more data chunks based on the directive type information.

5. The controller of claim 2, wherein the map data comprises a data type of each of the one or more data chunks, a bit sequence of each of the one or more data chunks in the temporal block, a physical address of a memory region associated with each of the one or more data chunks, and a logical address corresponding to each of the one or more data chunks.

6. The controller of claim 2, wherein the processor schedules commands in the interleaving scheme in order to store the data string and the map data in the temporal block, and provides the scheduled commands to the memory device.

7. The controller of claim 1, further comprising a power management unit (PMU) detecting the occurrence of the SPO.

8. The controller of claim 1, further comprising a host interface providing a write completion response to the host when the one or more data chunks are stored in the buffer.

9. A method of operating a controller for controlling a memory device, the method comprising:
buffering one or more data chunks received from a host into an internal buffer of the controller;
sorting and storing the one or more data chunks buffered in the internal buffer into a plurality of memory regions of the memory device according to data types of the one or more data chunks, during a normal operation, the plurality of memory regions respectively corresponding to a plurality of data types; and
in response to the occurrence of an SPO, generating map data indicating a relationship between the one or more data chunks buffered in the internal buffer and the plurality of memory regions of the memory device according to the data types of the one or more data chunks, generating a data string by merging the one or more data chunks, and temporally storing the data string and the map data in a temporal memory region of the memory device, the temporal memory region being separate from the plurality of memory regions, wherein the map data includes information indicating a start offset and a data size that indicate how many consecutive bits from a certain bit of the temporal memory region are the one or more data chunks, and wherein the method further comprises:
supplying, using a capacitor, emergency power to the controller and the memory device when the SPO occurs, the capacity of the capacitor being determined based on a size of the internal buffer and program performance when data are programmed into the memory device in an interleaving scheme.

10. The method of claim 9, wherein the temporally storing comprises:
alternately selecting, as a temporal block, one of memory blocks in the temporal memory region; and
storing the data string and the map data in the temporal block.

11. The method of claim 10, further comprising:
loading the data string and the map data from the temporal block when a memory system including the controller and the memory device is powered on after the occurrence of the SPO;
storing the one or more data chunks in memory regions associated with the one or more data chunks by referring to the map data; and
controlling the memory device to empty out the temporal block.

12. The method of claim 9, wherein the data types are directive types which are received with the one or more data chunks from the host, and the method further comprises receiving, from the host, directive type information indicating a data type of each of the one or more data chunks together with the one or more data chunks, and
wherein the sorting is performed based on the directive type information.

13. The method of claim 10, wherein the map data comprises a data type of each of the one or more data chunks, a bit sequence of each of the one or more data chunks in the temporal block, a physical address of a memory region associated with each of the one or more data chunks, and a logical address corresponding to each of the one or more data chunks.

14. The method of claim 10, wherein the storing of the data string and the map data in the temporal block comprises:
scheduling program commands for the one or more data chunks and the map data in the interleaving scheme; and
providing the scheduled program commands to the memory device.

15. The method of claim 9, further comprising providing a write completion response to the host when the one or more data chunks are stored in the internal buffer.

16. A controller for controlling a memory device, the controller comprising:
a buffer buffering one or more data chunks received from a host until the one or more data chunks are stored in the memory device; and
a processor sorting and storing, according to data types of the one or more data chunks, the one or more data chunks buffered in the buffer in a plurality of memory regions of the memory device in a normal operation, the plurality of memory regions respectively corresponding to a plurality of data types,
wherein, in response to the occurrence of a sudden power-off (SPO), the processor generates map data indicating a relationship between the one or more data chunks and the plurality of memory regions, generates a data string by merging the one or more data chunks, and temporarily stores the data string and the map data in a temporal memory region of the memory device,
wherein when a memory system including the controller and the memory device is powered on after the occurrence of the SPO, the processor loads the data string and the map data from the temporal memory region, stores the one or more data chunks in the plurality of memory regions by referring to the map data according to data types of the one or more data chunks, and controls the memory device to empty out the temporal memory region,
wherein the map data includes information indicating a start offset and a data size that indicate how many consecutive bits from a certain bit of the temporal memory region are the one or more data chunks, and
wherein the controller further comprises a capacitor supplying emergency power to the controller and the memory device when the SPO occurs, the capacity of the capacitor being determined based on a size of the buffer and program performance when data are programmed into the memory device in an interleaving scheme.

* * * * *